US010946327B2

(12) United States Patent
Doong

(10) Patent No.: US 10,946,327 B2
(45) Date of Patent: Mar. 16, 2021

(54) USE OF A PEAK-DAMPENING CAPACITOR TO IMPROVE ADSORBER SEPARATION PERFORMANCE

(71) Applicant: UOP LLC, Des Plaines, IL (US)

(72) Inventor: Shain-Jer Doong, Kildeer, IL (US)

(*) Notice: Subject to any disclaimer, the term of this patent is extended or adjusted under 35 U.S.C. 154(b) by 176 days.

(21) Appl. No.: 15/920,696

(22) Filed: Mar. 14, 2018

(65) Prior Publication Data

US 2018/0280862 A1  Oct. 4, 2018

Related U.S. Application Data

(60) Provisional application No. 62/480,139, filed on Mar. 31, 2017.

(51) Int. Cl.
*B01D 53/04* (2006.01)
*C10L 3/10* (2006.01)
*B01D 53/047* (2006.01)

(52) U.S. Cl.
CPC ...... *B01D 53/0407* (2013.01); *B01D 53/047* (2013.01); *B01D 53/0462* (2013.01); *C10L 3/101* (2013.01); *C10L 3/103* (2013.01); *B01D 2256/24* (2013.01); *B01D 2256/245* (2013.01); *B01D 2257/306* (2013.01); *B01D 2257/702* (2013.01); *B01D 2259/403* (2013.01); *B01D 2259/404* (2013.01); *B01D 2259/414* (2013.01); *C10L 2290/542* (2013.01)

(58) Field of Classification Search
CPC .. B01D 53/04; B01D 53/047; B01D 53/0407; B01D 53/0462; B01D 2257/306; B01D 2257/702; B01D 2256/24; B01D 2256/245; B01D 2259/403; B01D 2259/404; B01D 2259/414; B01D 2259/41; C10L 3/101; C10L 3/103; C10L 2290/542
USPC ............ 95/1, 25, 96, 135, 143; 96/121, 131, 96/132, 109, 117
See application file for complete search history.

(56) References Cited

U.S. PATENT DOCUMENTS

| | | | |
|---|---|---|---|
| 3,897,226 A | 7/1975 | Lang et al. | |
| 4,194,890 A | 3/1980 | McCombs et al. | |
| 4,552,570 A * | 11/1985 | Gravatt | B01D 53/0407 95/10 |
| 4,732,577 A | 3/1988 | Koizumi et al. | |
| 4,816,039 A | 3/1989 | Krishnamurthy et al. | |
| 5,232,473 A | 8/1993 | Kapoor et al. | |
| 5,346,536 A | 9/1994 | Kaneshige et al. | |
| 5,529,607 A | 6/1996 | Tan | |
| 5,997,611 A * | 12/1999 | Doong | B01D 53/0476 95/101 |

(Continued)

OTHER PUBLICATIONS

Supplemental European Search Report, dated Dec. 7, 2020, in corresponding EP application 18776726.4 (first 2 cited documents were previously cited in present application).

*Primary Examiner* — Frank M Lawrence, Jr.

(57) ABSTRACT

This invention uses a fixed-bed adsorber, interchangeably called a capacitor herein, to process the product stream coming out of a regenerable adsorption system such as a temperature swing adsorption system (TSA) or pressure swing adsorption system (PSA). The fluid stream coming out of this fixed-bed capacitor will have a more uniform composition than the one entering the adsorption system or the capacitor. The fixed-bed adsorber operates in a once-through non-cyclic manner, similar to a conventional fixed bed reactor or adsorber.

7 Claims, 5 Drawing Sheets

(56) References Cited

U.S. PATENT DOCUMENTS

| | | | |
|---|---|---|---|
| 8,372,375 B2 * | 2/2013 | Nakao | C01B 3/56 |
| | | | 423/648.1 |
| 8,545,603 B2 | 10/2013 | Maheshwary et al. | |
| 9,101,872 B2 | 8/2015 | Rarig et al. | |
| 2013/0192299 A1 | 8/2013 | Dolan | |
| 2014/0326136 A1 * | 11/2014 | Doong | B01D 53/0462 |
| | | | 95/41 |
| 2014/0326139 A1 * | 11/2014 | Kokubu | B01D 53/047 |
| | | | 95/96 |
| 2015/0275727 A1 * | 10/2015 | Hiltzik | F02M 25/089 |
| | | | 123/519 |
| 2015/0375158 A1 * | 12/2015 | Lang | B01D 53/0462 |
| | | | 422/187 |
| 2016/0082382 A1 * | 3/2016 | Doong | B01D 53/04 |
| | | | 95/119 |

* cited by examiner

USE OF A PEAK-DAMPENING CAPACITOR TO IMPROVE ADSORBER SEPARATION PERFORMANCE

CROSS-REFERENCE TO RELATED APPLICATION

This application claims priority from Provisional Application No. 62/480,139 filed Mar. 31, 2017, the contents of which cited application are hereby incorporated by reference in its entirety.

BACKGROUND OF THE INVENTION

The present invention involves an adsorption process. More particularly, the adsorption process and system involves the use of a capacitor to improve performance. Adsorption processes have been widely used in industries for gas or liquid separation or purification. When a fluid stream enters a fixed bed adsorber, the components that are more strongly adsorbed will be retained by the adsorbent, and those less strongly adsorbed components will pass through the adsorber, resulting in separation of the fluid components. In practice, the adsorption process is dynamic in nature, as the feed to the adsorber has to be stopped after a certain period of time when the adsorber is saturated with the strongly adsorbed components. The adsorber then needs to enter into a regeneration phase by reducing the fluid pressure and passing a purge gas in the case of pressure swing adsorption (PSA) or by raising the bed temperature by passing a hot regeneration gas in the case of temperature swing adsorption (TSA). While the strongly adsorbed components entering the bed can be completely adsorbed or removed resulting in a product stream free of the contaminants, in practice these contaminants often are allowed to breakthrough into the product stream as long as they can meet the product specification. Allowing the contaminants breakthrough into the product provides a benefit of reducing bed size and its associated regeneration requirement, which in turn reduces both operating and capital costs for the plant.

Before the contaminants breakthrough into the product, the product stream from the adsorbers actually contain little or no contaminants. A typical product composition profile for the contaminant is shown in FIG. 1. While the contaminant reaches a maximum composition before the end of the adsorption step, the average composition from the entire adsorption step is actually well below this maximum or peak. In order to meet the product specification at all time for this contaminant, the adsorption time would have to stop at time t1 despite the fact that the average composition meets the specification. If the adsorption separation system can be designed such that only the average product composition, not the peak composition, needs to meet the specification, the adsorber size can be reduced as the contaminant can be allowed to breakthrough further as shown in time t2 of FIG. 1.

There exists a need to reduce, dampen, or smooth out the product composition peaks from an adsorption separation system such as a temperature swing adsorption or pressure swing adsorption system so that the bed size can be reduced while meeting the product specification at all times.

DETAILED DESCRIPTION OF THE INVENTION

Figure 2:
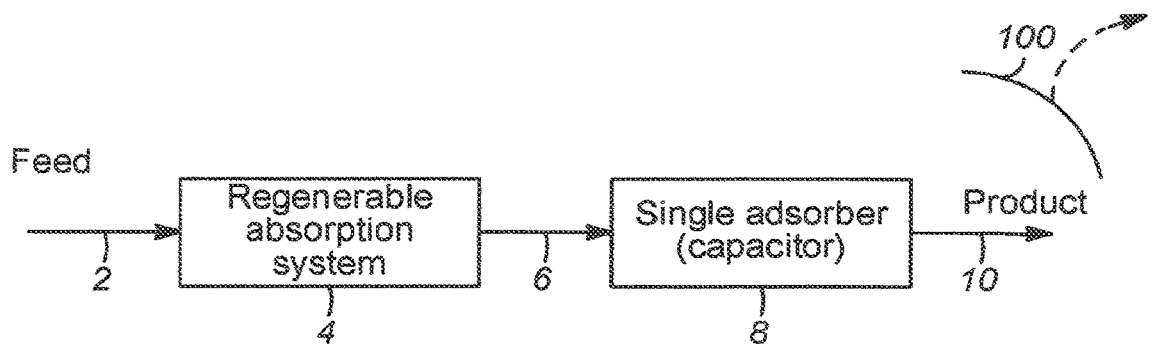
FIG. 2 shows a highly simplified drawing showing the use of a capacitor in a regenerable adsorption system.

This invention uses a fixed-bed adsorber, interchangeably called a capacitor herein, to process the product stream coming out of a cyclic regenerable adsorption system such as a temperature swing adsorption system (TSA) or pressure swing adsorption system (PSA). The fluid stream coming out of this fixed-bed capacitor will have a more uniform composition than the one entering the adsorption system or the capacitor. The fixed-bed adsorber operates in a once-through non-cyclic manner, similar to a conventional fixed bed reactor or adsorber. It may operate at ambient temperature and at the same pressure as the feed gas pressure. Any adsorbent material that has adsorption capacities for the contaminant components showing peak profiles can be used for the capacitor. The preferred adsorbent in the capacitor will be the same as that used in the upstream cyclic adsorption process (TSA or PSA), which generates the product stream with a peak concentration. FIG. 2 shows a simplified flow diagram for the concept.

Figure 4:
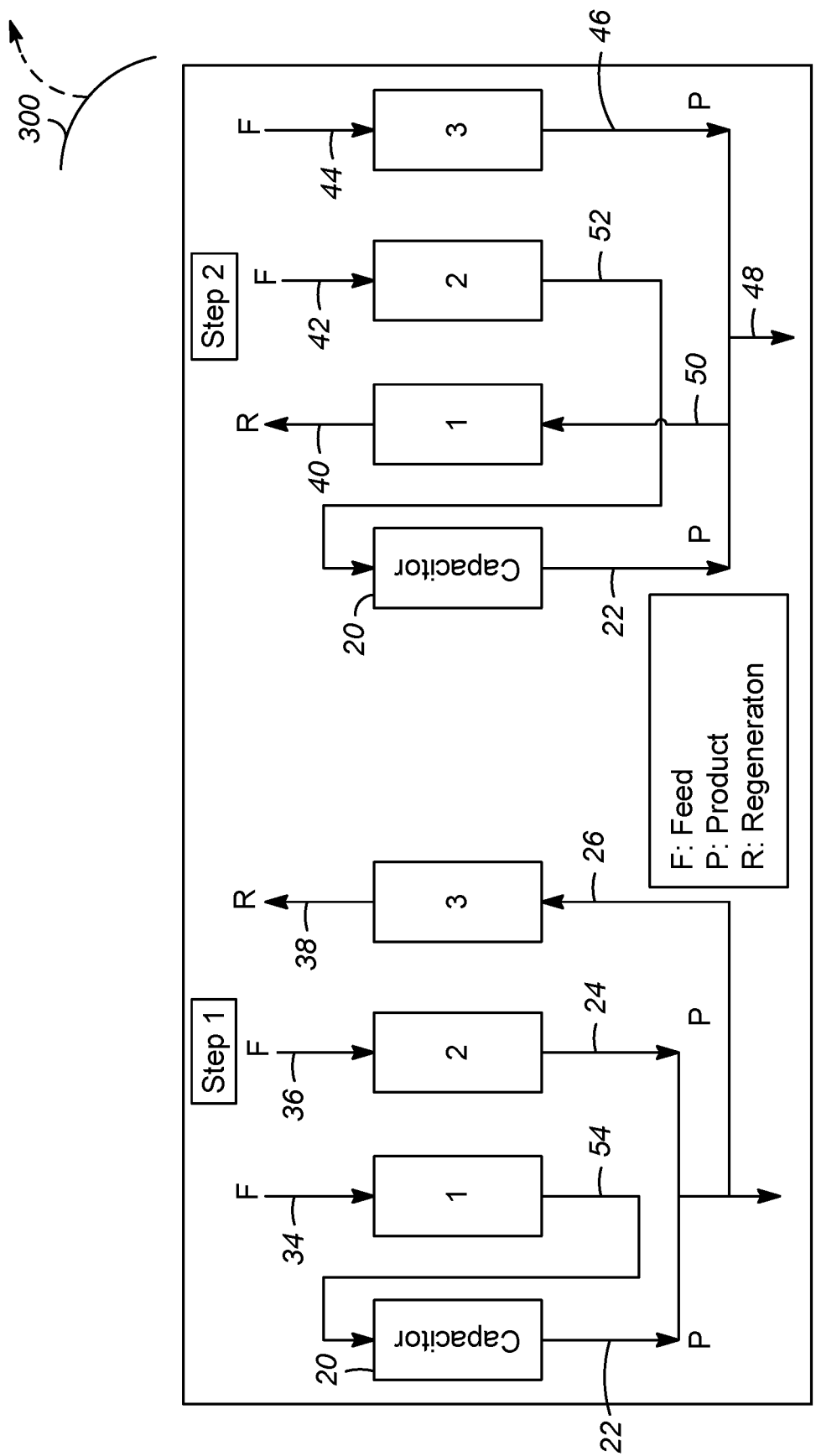
FIG. 4 shows the integration of the capacitor within a TSA/PSA cycle.

To handle a feed with a very high flow, multiple parallel adsorbers may be used to reduce the bed pressure drop in the TSA/PSA system. Instead of processing the overall product stream from the TSA/PSA system with the capacitor of the present invention, the capacitor can be integrated into the TSA/PSA cycle to process the product flow from each individual adsorber. One example of this is shown in FIG. 4, where a 3 bed TSA system is used with 2 parallel beds receiving the feed at the same time. But the added capacitor processes the product flow from only one bed at a time and switches to other beds within the cycle. In step 1, feed gas is sent to bed 1 and the product stream from bed 1 is sent to the capacitor for dampening the composition peaks. Bed 2 also receives the feed, but its product is combined with the product from the capacitor. Bed 3 is undergoing the bed regeneration step after taking a slip stream from the combined product stream. As is well known by those who are skilled in the adsorption processes, regeneration stream can also come from other external sources. In Step 2, bed 1, which has just finished sending its product stream to the capacitor is being regenerated. Bed 2 send its product to the capacitor. Bed 3, which has been regenerated in step 1 receives the feed, but does not sent its product to the capacitor. The steps continue in a cyclic way, as in commercial TSA/PSA cycles.

Figure 1:
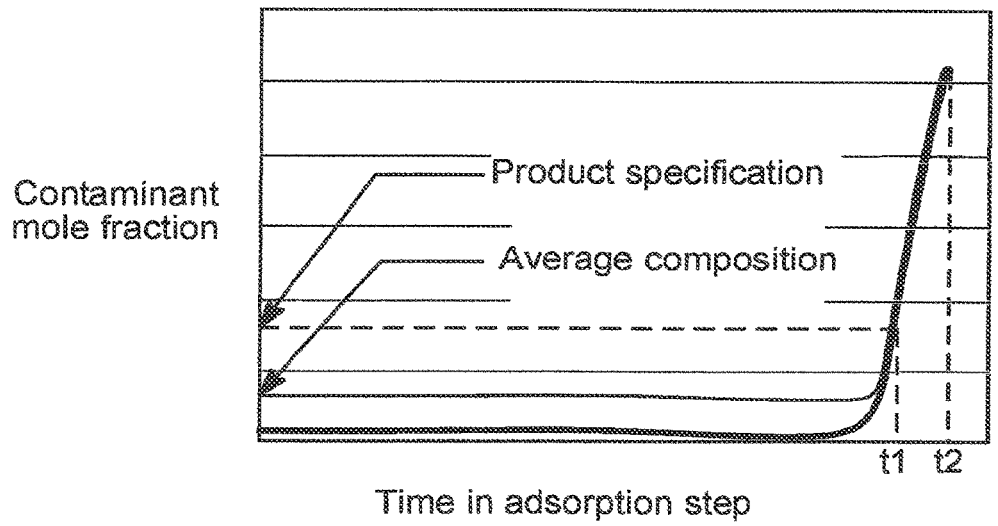
FIG. 1 shows a breakthrough curve for an adsorption separation process.

FIG. 1 shows the breakthrough curve for an adsorption separation process. On the y-axis is the relative contaminant mole fraction. A dashed line is shown to indicate the product specification and the average composition is shown below it. The contaminant mole fraction is maintained at a minimal level until close to a t1 time when it starts to rapidly increase to exceed the product specification and shortly thereafter if no action was taken, it would be significantly over the product specification at time t2. As shown in FIG. 1, the peak profile generally appears toward the end of the adsorption step. Dampening the product peak from the adsorber that is about to be regenerated or has completed the $1^{st}$ step of adsorption will have more significant impact in its dampening effect.

The other benefit of integrating the capacitor with the TSA/PSA cycle is to minimize the bed pressure drop for the capacitor as the flow through the capacitor is lower than the scheme shown in FIG. 2. More specifically, in FIG. 2 is shown a feed 2 entering a regenerable adsorption system 4 to produce a treated feed 6 which then passes through a single adsorber, also referred to as a capacitor 8 with then product 10 shown passing to the right. The capacitor processes the treated feed from a regenerable adsorption system to dampen the product peak composition.

Figure 3:
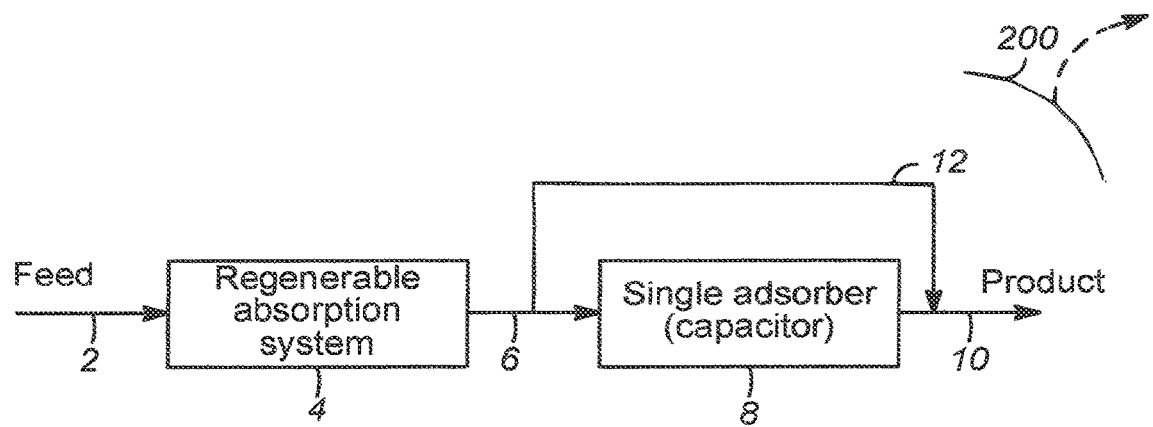
FIG. 3 is a modification of the system of FIG. 2 that includes a bypass around the capacitor.

In FIG. 3, is shown a simplified diagram of a modification of FIG. 2 showing the use of the capacitor to process the product gas from a regenerable adsorption system to dampen the product peak composition including a bypass around the capacitor. A feed 2 is shown entering a regenerable adsorption system 4 to produce a treated feed 6 which then passes through a single adsorber, also referred to as a capacitor 8 with then product 10 shown passing to the right. A bypass stream 12 that may contain all or a portion of treated feed 6 is shown to bypass the capacitor 8 prior to encountering issues with breakthrough.

FIG. 4 shows the integration of the capacitor within a TSA/PSA cycle. In step 1 on the left side of FIG. 4, a feed 34 enters adsorption bed 1 and then exits through line 54 to pass through capacitor 20 with product 22 exiting at the bottom. A portion 26 of product 22 is sent through adsorption bed 3 to regenerate the bed with a stream 38 exiting the top of adsorption bed 3. In FIG. 4 is also shown an adsorption bed 2 through which a feed 36 passes and then exits as product 24 to be combined with product 22. On the right side of FIG. 4 is shown step 2 with the flows reversed in adsorption beds 1 and 3 as compared to step 1. A feed 42 enters adsorption bed 2 and passes through line 52 to capacitor 20 to produce product stream 22. A portion of product stream 22 is sent through line 50 to regenerate adsorption bed 1. Feed 44 passes through adsorption bed 3 to produce product stream 46 that is combined with product stream 22 into combined product stream 48.

Figure 5:
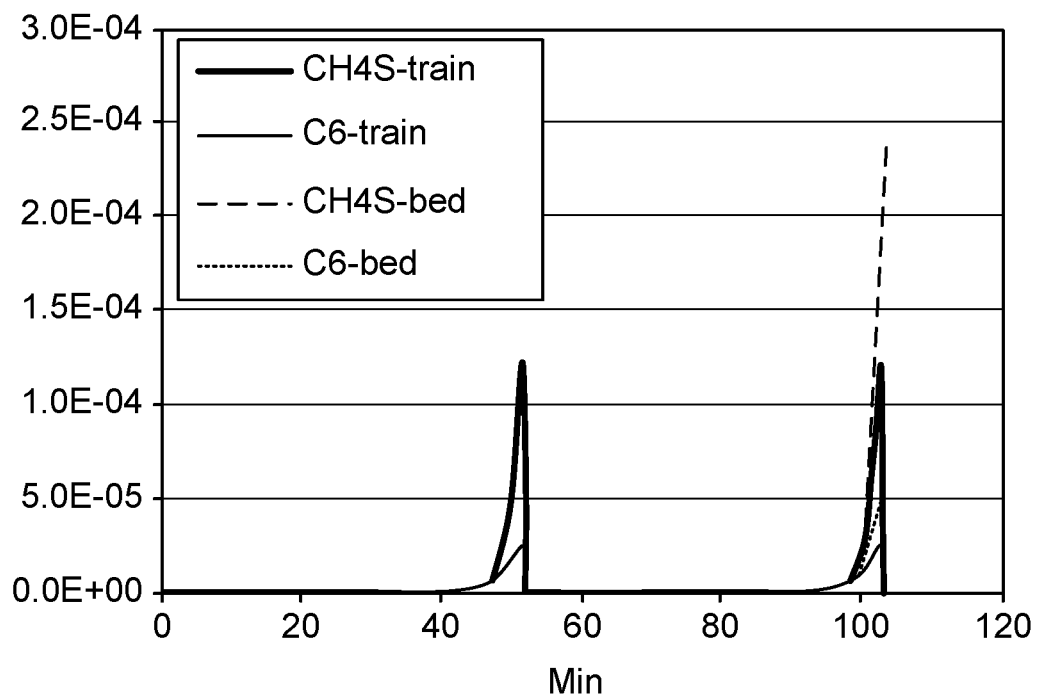
FIG. 5 shows the product gas composition profiles of Example 1.
Figure 6:
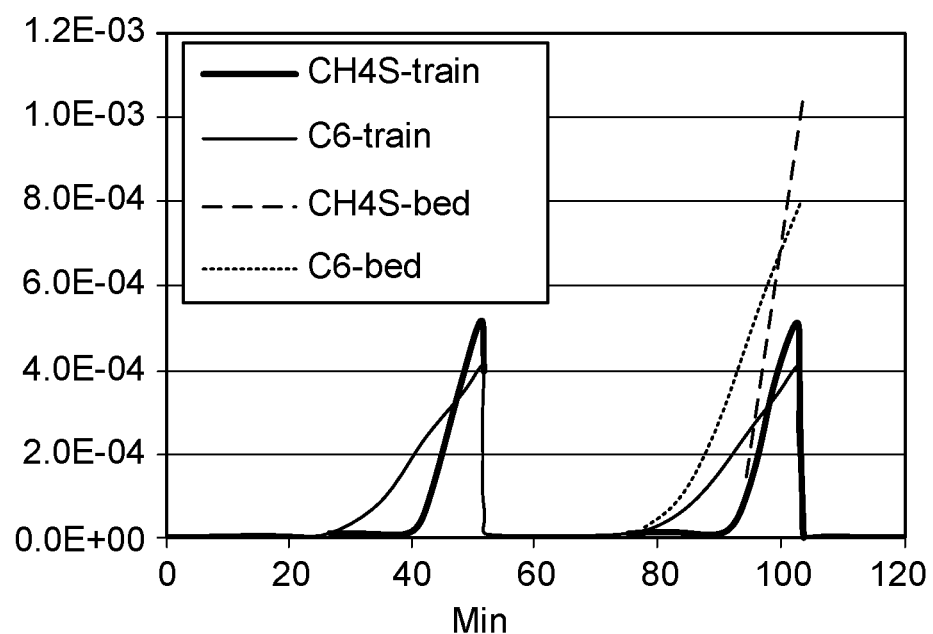
FIG. 6 shows the product gas composition profiles of Example 2.
Figure 7:
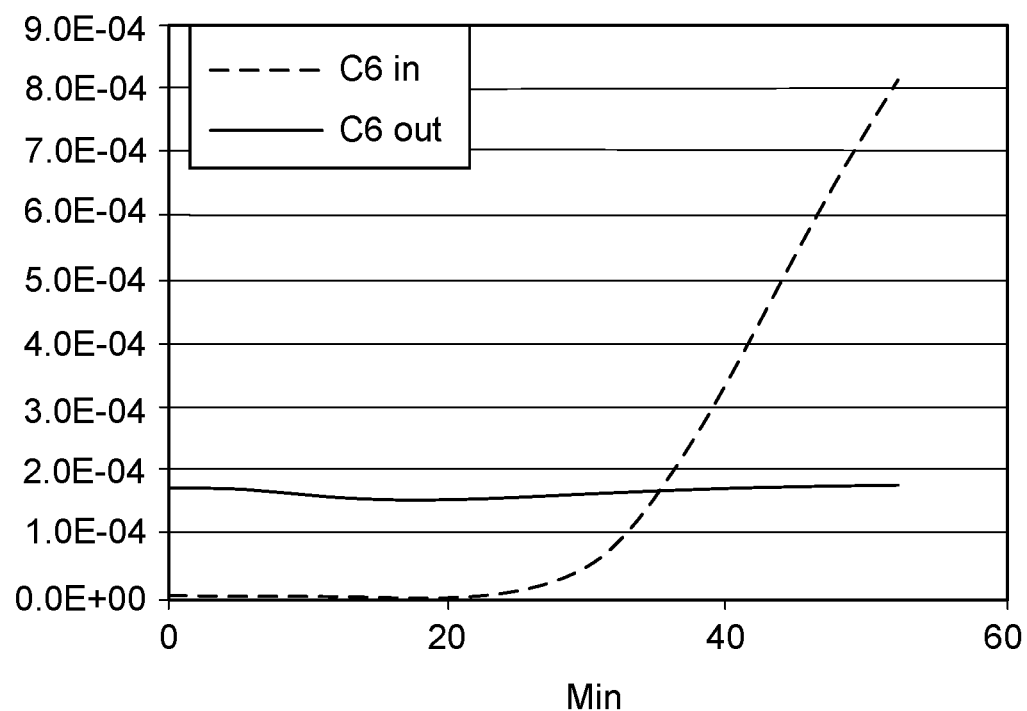
FIG. 7 shows gas composition profiles entering and leaving the capacitor for Example 2.
Figure 8:
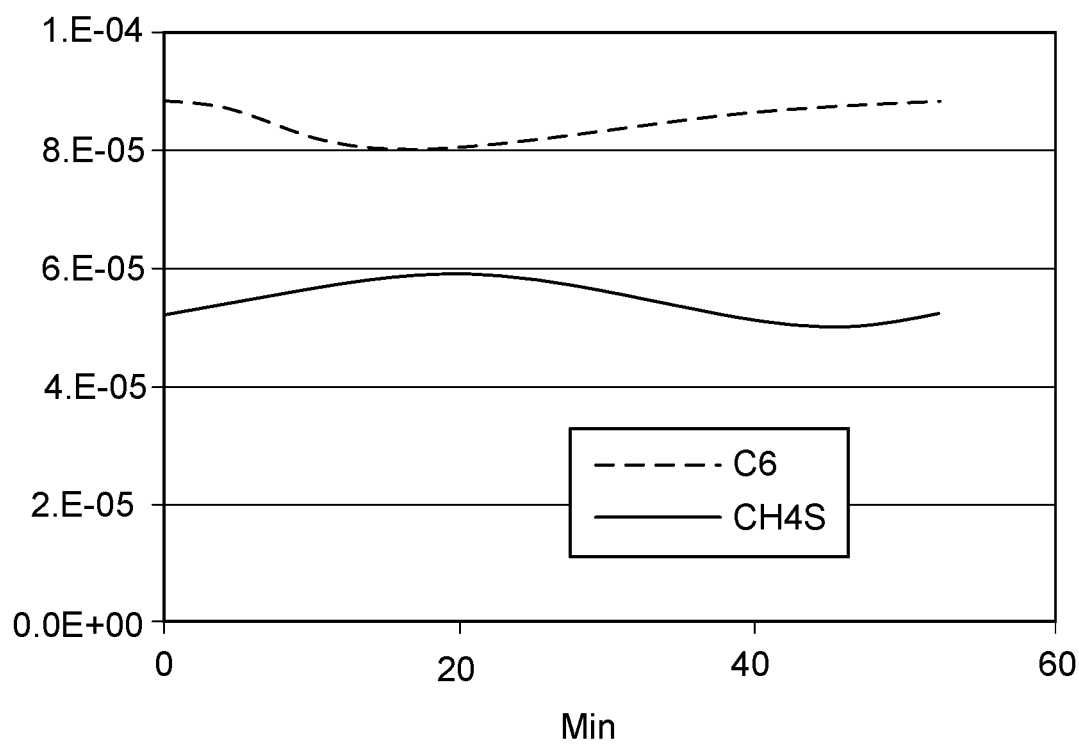
FIG. 8 shows the final overall product composition profiles for Example 2.

FIG. 5 shows a product gas composition profile for Example 1. The peak on the left has a C6/CH4S as the lower/higher peak. The peak on the right has the C6 bed/CH4S bed as the lower and higher peaks. In FIG. 6 is shown the product gas composition profile for Example 2 with the peaks representing the same streams as in FIG. 5. FIG. 7 shows the mole fraction over time in the adsorption step for gas composition profiles entering and leaving the capacitor for Example 2. FIG. 8 shows the final overall product composition profiles for Example 2 in mole fraction over time in the adsorption step. The top line is the C6 and the bottom line is the CH4S.

Any of the above conduits, unit devices, scaffolding, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect. FIGS. 2, 3 and 4 shows the above categorically as 100, 200 and 300 respectively.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein. FIGS. 2, 3 and 4 shows the above categorically as 100, 200 and 300 respectively.

The following examples demonstrate how to use the current invention.

EXAMPLE 1

Prior Art

A natural gas stream at a flow rate of 340 MMSCFD at 39 bar and 17° C. with a composition shown in Table 1 is to be treated to remove the mercaptan and heavy hydrocarbon contents. The gas is sent to a 4 bed TSA unit packed with silica gel adsorbent with a regeneration time of 52 minutes and a regeneration flow of 66 MMSCFD. The product gas is required to meet a specification of <130 ppm mercaptan, <100 ppm C6+ and <80 ppm BTEX. The BTEX specification can be easily met as they do not reach breakthrough at all. The governing component for meeting the product specification is the amount of methyl mercaptan. Using a dynamic adsorption process simulation, the product composition profiles for both methyl mercaptan and C6 are shown in FIG. 5 for both individual bed and the average train profile or combining the product profiles from the 2 parallel adsorption beds. As can be seen, even though the peak CH4S for individual bed does not meet the specification, the train peak can meet the required 130 ppm specification. C6 can meet the product specification without difficulty.

TABLE 1

| Gas Feed Compositions for Example 1 | |
|---|---|
| Benzene | 8.31E−04 |
| C1 | 6.06E−01 |
| C2 | 2.21E−02 |

TABLE 1-continued

Gas Feed Compositions for Example 1

| | |
|---|---|
| C3 | 8.52E-03 |
| C4 | 3.94E-03 |
| CH4S | 8.73E-04 |
| CO2 | 3.39E-01 |
| H2O | 7.09E-04 |
| H2S | 1.15E-02 |
| N2 | 3.41E-03 |
| C5 | 1.52E-03 |
| C6 | 1.03E-03 |
| C7 | 3.89E-04 |
| C8 | 8.18E-05 |
| C9 | 3.13E-05 |
| C10 | 1.66E-05 |
| O-Xylene | 5.77E-05 |
| Toluene | 3.47E-04 |

EXAMPLE 2

This is a comparative example using the current invention with an added capacitor operating in a cycle similar to FIG. 4, but with a 4 bed arrangement. Operating the same conditions as in Example 1 but with smaller adsorbers and a lower regeneration flow rate, the product profiles are shown in FIG. 6. Compared to FIG. 5, the peak for individual bed is much higher showing more breakthrough due to the use of smaller adsorbers. Product specifications cannot be met for both components.

When the added capacitor is used to process the product stream from the individual bed, the results are shown in FIG. 7 for the gas streams in and out of the capacitor. The capacitor almost eliminates the product peaks for both mercaptan and C6.

As shown in FIG. 4, for this configuration, the output of the capacitor is combined with the product stream from the other adsorber to make up the final overall product stream. The product from the other adsorber has no breakthrough of mercaptan or C6 as shown in FIG. 6 for the profiles between 0 to 52 minutes based on individual beds (dashed lines). The combined product profiles are shown in FIG. 8. Both mercaptan and C6 easily meet the specification.

The bed size and the regeneration flow for both Examples 1 and 2 are shown in Table 2. Using the current invention results in nearly 20% saving of the total adsorbent needed and about 25% reduction in the regeneration flow needed. This corresponds to about 9% Capex saving and about 25% Opex saving.

TABLE 2

| | Example 1 | Example 2 |
|---|---|---|
| No of beds | 4 | 4 |
| Relative adsorbent amount per bed | 1 | 0.76 |
| Relative capacitor adsorbent | 0 | 0.34 |
| Relative total adsorbent | 4 | 3.38 |
| Reg flow, MMSCFD | 66 | 53 |
| Relative Capex | 1.09 | 1 |
| Relative Opex | 1.25 | 1 |

EXAMPLE 3

Prior Art

Figure 9:
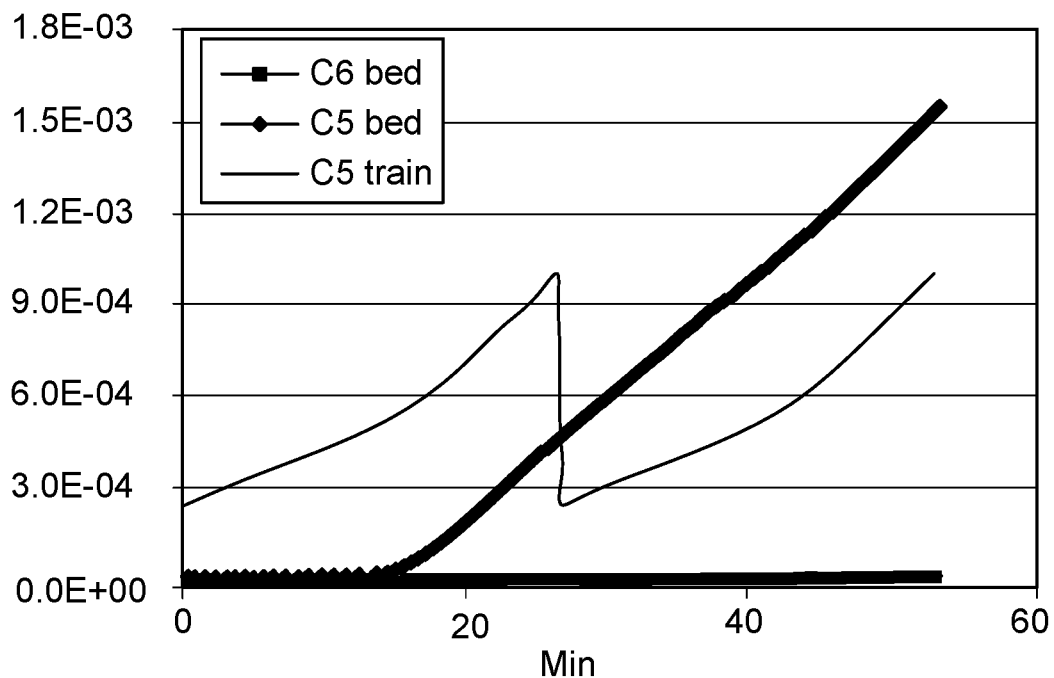
FIG. 9 shows the product gas composition profiles of Example 3.

A natural gas stream at a flow rate of 200 MMSCFD at 68 bar and 20° C. with a composition shown in Table 3 is to be removed its benzene and heavy hydrocarbon contents. The gas is sent to a 4 bed TSA unit packed with layers of silica gel and molecular sieve adsorbent with a regeneration time of 40 minutes and a regeneration flow of 92 MMSCFD. The product gas is required to meet a specification of <1000 ppm C5, <100 ppm C6+ and <1 ppm benzene. The governing component for meeting the product specification is C5. Using a dynamic adsorption process simulation, the product composition profiles for both C5 and C6 are shown in FIG. 9 for the bed profiles and the average train profile or combining the product profiles from the 2 parallel adsorption beds. As can be seen, the train peak of C5 can meet the required 1000 ppm specification. C6 and benzene can meet the product specification without difficulty.

TABLE 3

Gas Feed Compositions for Example 3

| | |
|---|---|
| Benzene | 7.79E-05 |
| C1 | 8.86E-01 |
| C2 | 6.51E-02 |
| C3 | 1.27E-02 |
| C4 | 8.87E-03 |
| CO2 | 4.57E-05 |
| N2 | 2.06E-02 |
| C5 | 4.80E-03 |
| C6 | 1.56E-03 |

EXAMPLE 4

Figure 10:
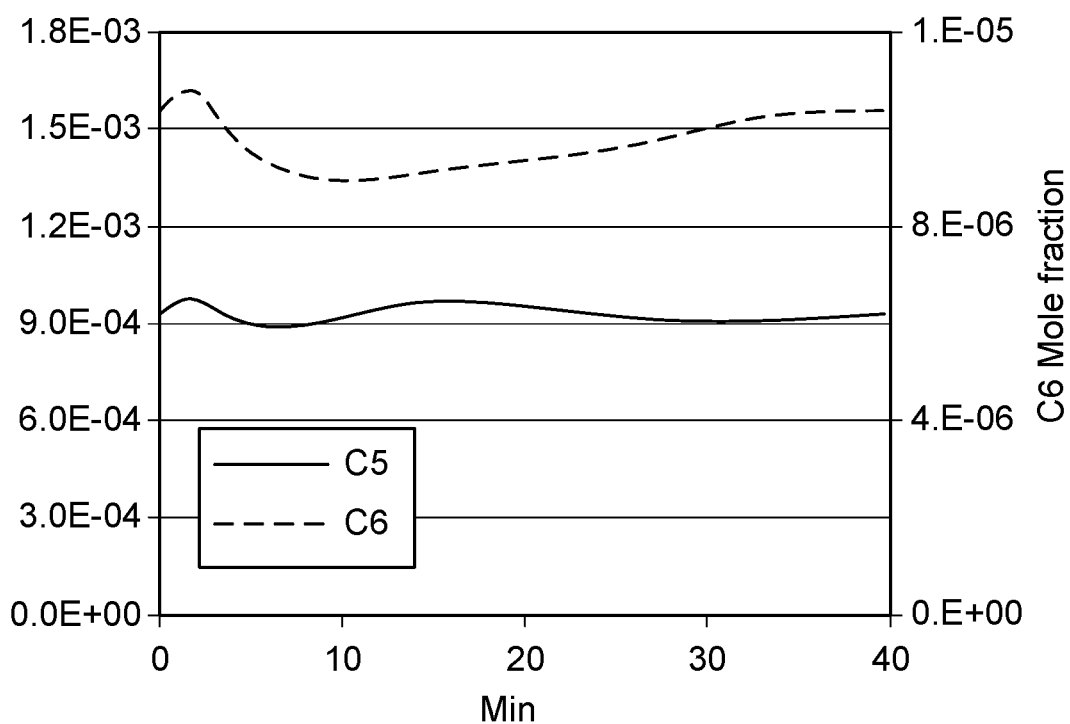
FIG. 10 shows the final overall product composition profiles for Example 4.

Example 4 is a comparative example using the current invention with an added capacitor to process the entire final product stream, as shown in FIG. 2. Operating the same conditions as in Example 3, but with smaller adsorbers and a lower regeneration flow rate, the final product profiles from the capacitor are shown in FIG. 10. As can be seen, C5 can meet the 1000 ppm specification and has less fluctuation than the profile in FIG. 9.

The bed size and the regeneration flow for both Examples 3 and 4 are shown in Table 3. Using the current invention results in nearly 5% saving of the total adsorbent needed and about 25% reduction in the regeneration flow needed.

TABLE 4

| | Example 1 | Example 2 |
|---|---|---|
| No of beds | 4 | 4 |
| Relative adsorbent amount per bed | 1 | 0.76 |
| Relative capacitor adsorbent | 0 | 0.77 |
| Relative total adsorbent | 4 | 3.8 |
| Reg flow, MMSCFD | 92 | 74 |

Specific Embodiments

While the following is described in conjunction with specific embodiments, it will be understood that this description is intended to illustrate and not limit the scope of the preceding description and the appended claims.

A first embodiment of the invention is a process for treating a fluid stream comprising sending the fluid stream through a regenerable adsorber to remove contaminants and producing a partially purified fluid stream and then sending at least a first portion of the partially purified fluid stream through a single adsorber capacitor. An embodiment of the invention is one, any or all of prior embodiments in this paragraph up through the first embodiment in this paragraph wherein a second portion of the partially purified fluid stream bypasses the single adsorber capacitor. An embodiment of the invention is one, any or all of prior embodiments in this paragraph up through the first embodiment in this paragraph wherein the regenerable adsorber bed comprises one or more pressure swing adsorption beds. An embodiment of the invention is one, any or all of prior embodiments in this paragraph up through the first embodiment in this paragraph wherein the regenerable adsorption bed comprises one or more temperature swing adsorption beds. An embodiment of the invention is one, any or all of prior embodiments in this paragraph up through the first embodiment in this paragraph wherein the contaminants comprises mercaptans and heavy hydrocarbons. An embodiment of the invention is one, any or all of prior embodiments in this paragraph up through the first embodiment in this paragraph wherein the regenerable adsorber comprises two or more adsorbers and the partially purified fluid stream from one of the adsorbers passes through the adsorber capacitor at a time. An embodiment of the invention is one, any or all of prior embodiments in this paragraph up through the first embodiment in this paragraph wherein, further comprising at least one of: sensing at least one parameter of the process and generating a signal from the sensing; sensing at least one parameter of the process and generating data from the sensing; generating and transmitting a signal; or generating and transmitting data.

A second embodiment of the invention is an adsorption system comprising one or more adsorbers and at least one adsorber capacitor configured to extend a period of time before the one or more adsorbers require regeneration. An embodiment of the invention is one, any or all of prior embodiments in this paragraph up through the first embodiment in this paragraph wherein the system comprises at least one of a sensor for sensing at least one parameter of the process and generating a signal from the sensing; a sensor for sensing at least one parameter of the process and generating data from the sensing; a means for generating and transmitting a signal; and generating and transmitting data.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for treating a fluid stream comprising:
sending said fluid stream through a regenerable adsorber to remove contaminants, said regenerable adsorber comprises two or more adsorbers wherein a product stream is produced from each of said adsorbers;
passing the product stream from one of said adsorbers, through an adsorber capacitor and processing the product stream from only one adsorber at a time and then switching said adsorber capacitor to process the product stream from another adsorber within a cycle;
combining the product stream from the adsorber capacitor with the product stream from all other adsorbers, and wherein said adsorber capacitor comprises a fixed bed adsorbent bed.

2. The process of claim 1 wherein said regenerable adsorber comprises two or more pressure swing adsorption beds.

3. The process of claim 1 wherein said regenerable adsorber comprises two or more temperature swing adsorption beds.

4. The process of claim 1 wherein said contaminants comprises mercaptans and heavy hydrocarbons.

5. The process of claim 1, further comprising at least one of:
sensing at least one parameter of the process and generating a signal from the sensing;
sensing at least one parameter of the process and generating data from the sensing;
generating and transmitting a signal;
generating and transmitting data.

6. An adsorption system comprising:
two or more adsorbers producing a product stream from each of said adsorbers;
an adsorber capacitor in communication with said product stream from one of said adsorbers at a time, wherein said adsorber capacitor is configured to dampen a product peak composition before said two or more adsorbers require regeneration; and
a product stream line from the adsorber capacitor in communication with the product stream from all other adsorbers, wherein said adsorber capacitor comprises a fixed bed adsorbent bed.

7. The system of claim 6, further comprising at least one of:
a sensor for sensing at least one parameter of the process and generating a signal from the sensing;
a sensor for sensing at least one parameter of the process and generating data from the sensing;
a means for generating and transmitting a signal;
a means for generating and transmitting data.

* * * * *